Dec. 29, 1925.

C. M. MARTIN ET AL 1,567,971

WATER MOTOR

Filed June 21, 1924     2 Sheets-Sheet 1

Inventors:
C. M. MARTIN AND
McKENZIE ARNN,

By *Monroe E. Miller*

Attorney.

Dec. 29, 1925.

C. M. MARTIN ET AL 1,567,971

WATER MOTOR

Filed June 21, 1924        2 Sheets-Sheet 2

Inventors:
C. M. MARTIN AND
McKENZIE ARNN,

By *Monroe E. Miller*

Attorney.

Patented Dec. 29, 1925.

1,567,971

UNITED STATES PATENT OFFICE.

CELLIE MARCEL MARTIN, OF HOGES STORE, AND McKENZIE ARNN, OF ROANOKE, VIRGINIA.

WATER MOTOR.

Application filed June 21, 1924. Serial No. 721,595.

*To all whom it may concern:*

Be it known that we, CELLIE M. MARTIN, a citizen of the United States, residing at Hoges Store, in the county of Giles, State of Virginia, and McKENZIE ARNN, a citizen of United States, residing at Roanoke, in the county of Roanoke and State of Virginia, have invented certain new and useful Improvements in Water Motors, of which the following is a specification, reference being had therein to the accompanying drawing.

The present invention relates to water motors, and aims to provide a novel and improved machine for obtaining power from small streams with a short fall of water.

Another object of the invention is the provision of such a water motor including buckets mounted for circuitous movement, with the majority of the buckets filled with water and travelling down reverse inclines, and means being provided for dumping the water from the buckets before they ascend to the top where the buckets receive the water from the stream.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
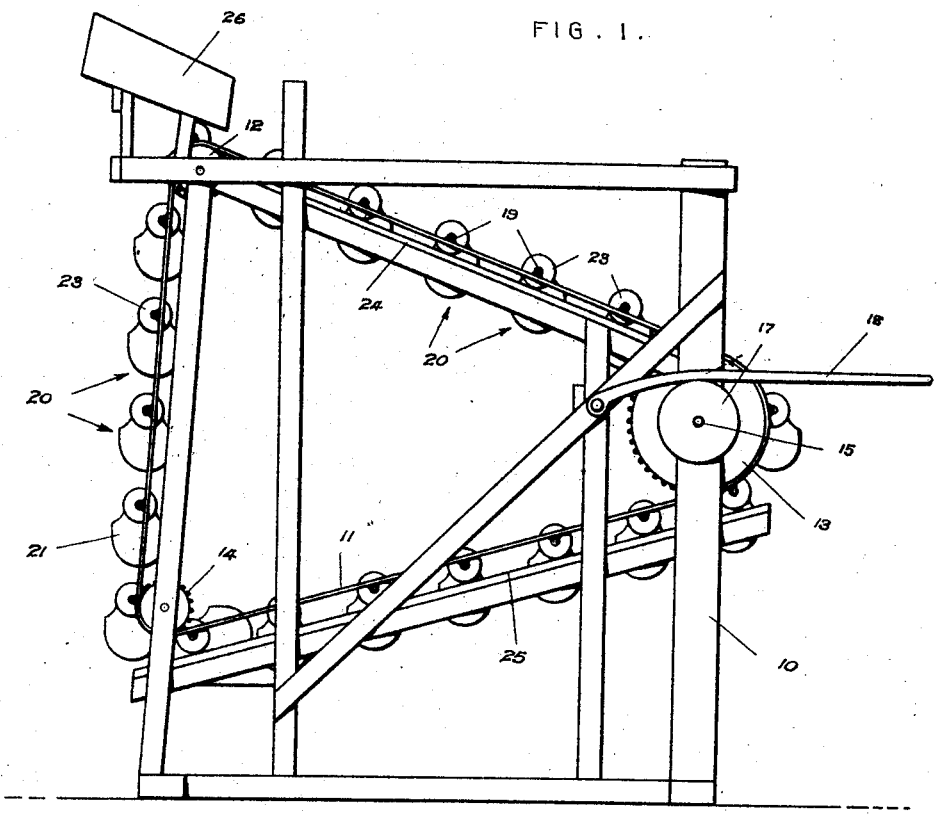
Figure 1 is a side elevation of the improved water motor.
Figure 4:
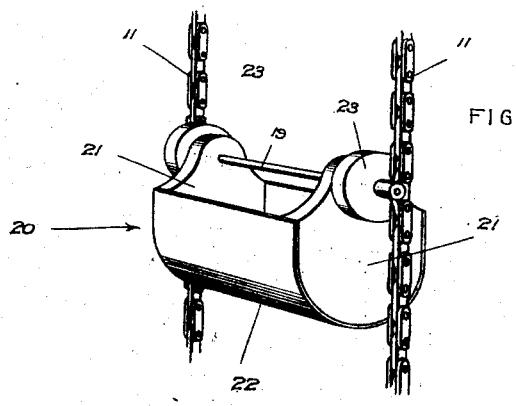
Fig. 4 is a perspective view of one of the buckets.
Figure 2:
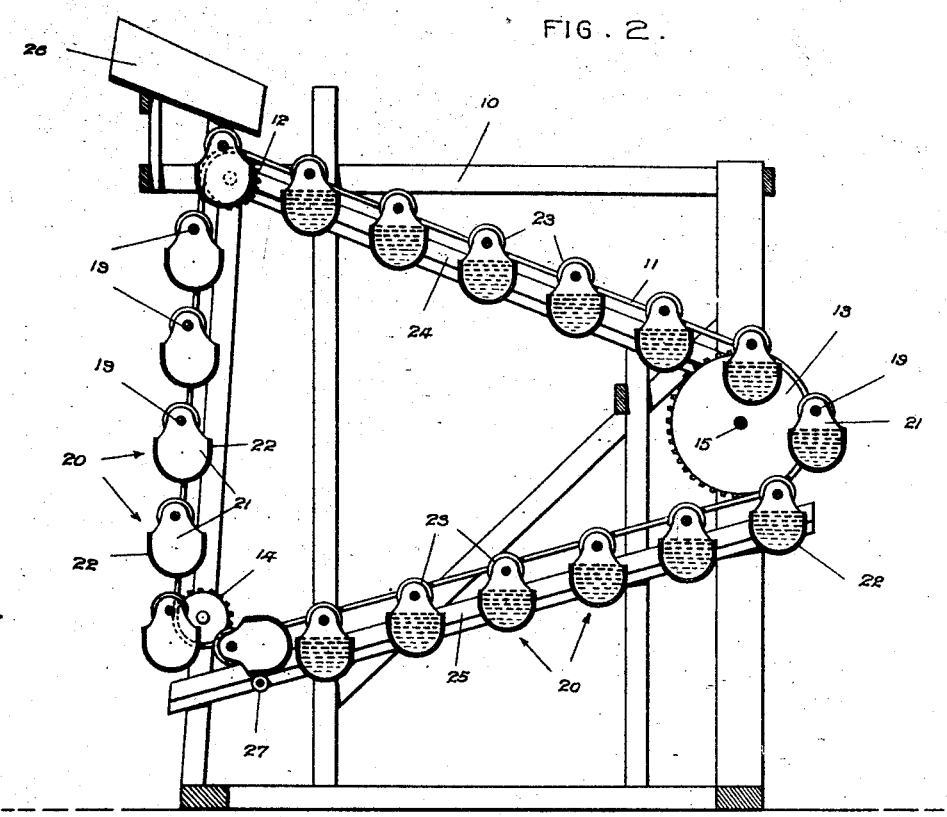
Fig. 2 is a vertical section thereof taken on the line 2—2 of Fig. 3.
Figure 3:
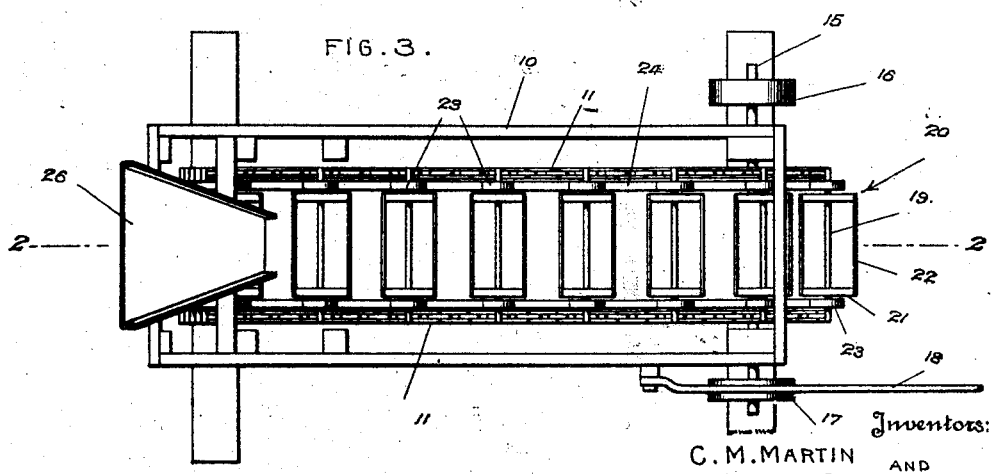
Fig. 3 is a plan view of the machine.

A suitable frame 10 is provided, which may be of any desired size, and a pair of endless sprocket chains 11 are mounted for circuitous movement in said frame along a triangular path, said sprocket chains being trained around the sprocket wheels 12, 13 and 14. The sprocket wheels 12 and 14 are journaled to the sides of the frame 10 at the rear end of the frame in vertically spaced horizontal planes, while the sprocket wheels 13 are secured on a transverse shaft 15 journaled in the forward end portion of the frame in a horizontal plane midway between the horizontal planes of the axes of the sprocket wheels 12 and 14. The chains thus form triangles in passing around the sprocket wheels.

The shaft 15 has a pulley wheel 16 thereon for transmitting the power, or other gearing can be used for taking the power from the motor. A brake wheel 17 is also secured on said shaft 15 for the engagement of a brake lever 18 fulcrumed to the frame 10, when it is desired to retard or stop the motor.

Transverse shafts 19 are carried by the chains 11 at spaced intervals longitudinally of the chains, and the buckets 20 are suspended loosely from said shafts. Each bucket comprises the ends 21 engaging the corresponding shaft 19, and the bent plate 22, of U-shaped cross section, secured to the ends 21. The bucket being pivotally suspended from the chains will remain in pendant position.

Rollers or wheels 23 are mounted for rotation on the shafts 19 between the buckets 20 and chains 11 to roll on the upper and lower inclined rails 24 and 25 carried by the frame 10. The rails 24 slope forwardly from the sprocket wheels 12 to the sprocket wheels 13, and the wheels 25 slope rearwardly from below the sprocket wheels 13 to a point below the sprocket wheels 14. Thus, the rollers 23 travelling on the rails 24 and 25 will support the buckets of the upper and lower inclined runs of the chains 11. This will prevent the chains from sagging downwardly under the weight of the water in the buckets.

The water from the stream, spring or other source is delivered from a chute or spout 26 above the sprocket wheels 12 in the general direction of movement of the upper run of the chains 11, so as to flow into the buckets as they move from below the chute 26.

The majority of buckets are moving along the rails 24 and 25, it being noted that the buckets move downwardly and forwardly along the upper inclined rails 24 and then downwardly and rearwardly along the lower rails 25. The buckets 20 can pass between the sprocket wheels 12, 13 and 14, and the sprocket wheels 13 are of sufficiently large diameter so that the shaft 15 does not interfere with the buckets.

When the buckets reach the lower end portions of the rails 25 they are tilted in succession, for dumping the water therefrom. Thus, a roller 27 or other tripping member is carried by the frame 10 near the sprocket wheels 15 in the path of the buckets, so that when the buckets pass over said roller or member 27, the buckets are tilted, thereby dumping the water rearwardly therefrom. The buckets are thus emptied before they move upwardly along the vertical run of the chains 11, and as the buckets move forwardly from under the chute 26 they receive the water from said chute, thus providing a continuous operation.

The machine will operate smoothly, and the parts thereof are readily accessible so that repairs can be quickly and conveniently made. The construction is also simple, and can be made in different sizes according to the volume of water available and power desired.

With the present construction the upper inclined run of the sprocket chains can extend downwardly at substantially the same angle at which the water discharges from the chute or spout 26, and the rollers 23 moving on the rails 24 and 25 will provide for a smooth action of the motor. Also, any water dripping from the upper buckets may be caught by some of the lower buckets as the buckets are moving downwardly. The buckets remaining in pendent position in their downward movement, excepting when tilted, will remain full of water up to the rims or edges thereof, so as to carry the full amount of water from the top to the bottom, thereby obtaining more power than when the buckets are only partially filled in their downward movement.

Having thus described the invention, what is claimed as new is:—

A water motor comprising a frame sprocket wheels mounted in the frame, sprocket chains trained around said sprocket wheels, transverse shafts carried by said chains, buckets suspended from said shafts between the chains, said sprocket wheels and chains being arranged to form a triangle so that the chains have upper and lower reversely inclined runs movable downwardly and a substantially vertical run movable upwardly, means for delivering water into the buckets after they reach the upper end of the vertical run so that the filled buckets move downwardly along said reversely inclined runs, rollers on said shafts, upper and lower reversely inclined rails at the upper and lower runs of the chains on which said rollers travel along said upper and lower runs, and a tripping roller at the lower ends of the lower rails over which the buckets are tilted and emptied before moving upwardly along the vertical run.

In testimony whereof we hereunto affix our signatures.

CELLIE MARCEL MARTIN.
McK. ARNN.